United States Patent
Eversmann et al.

(10) Patent No.: US 8,280,531 B2
(45) Date of Patent: Oct. 2, 2012

(54) METHOD AND COMPUTER PROGRAM FOR CONTROLLING THE HEAT TREATMENT OF METAL WORKPIECES

(75) Inventors: Thomas Eversmann, Dorsten (DE); Thomas Muhlhaus, Emmerich am Rhein (DE); Frank Biester, Kleve (DE); Regina Wolf, Kalkar (DE); Jorg Willeke, Hilden (DE); Werner Schulte, Hunxe (DE)

(73) Assignee: Ipsen, Inc., Cherry Valley, IL (US)

( * ) Notice: Subject to any disclaimer, the term of this patent is extended or adjusted under 35 U.S.C. 154(b) by 204 days.

(21) Appl. No.: 12/752,259

(22) Filed: Apr. 1, 2010

(65) Prior Publication Data
US 2010/0256798 A1    Oct. 7, 2010

(30) Foreign Application Priority Data
Apr. 3, 2009    (DE) .......................... 10 2009 016 138

(51) Int. Cl.
| | |
|---|---|
| *G05B 13/02* | (2006.01) |
| *G06F 19/00* | (2006.01) |
| *C21D 11/00* | (2006.01) |
| *C21D 1/54* | (2006.01) |
| *C21D 1/55* | (2006.01) |
| *H05B 1/02* | (2006.01) |
| *H01L 21/20* | (2006.01) |
| *H01L 21/36* | (2006.01) |
| *H01L 33/00* | (2010.01) |
| *H01L 21/265* | (2006.01) |
| *H01L 21/44* | (2006.01) |

(52) U.S. Cl. .............. 700/30; 700/31; 700/96; 700/145; 148/500; 148/508; 219/483; 219/490; 438/502; 438/509; 438/522; 438/660

(58) Field of Classification Search .............. 700/28–31, 700/95, 96, 117, 145; 219/200, 482, 483, 219/486, 490, 494, 497; 148/500, 508, 511; 438/478, 500, 502, 507–510, 514, 518, 522, 438/584, 597, 660
See application file for complete search history.

(56) References Cited

U.S. PATENT DOCUMENTS
4,770,630 A * 9/1988 Akimoto et al. .............. 432/121
(Continued)

FOREIGN PATENT DOCUMENTS
| | | |
|---|---|---|
| EP | 0 556 176 | 8/1993 |
| WO | 2009046691 | 4/2009 |

OTHER PUBLICATIONS

Balbis et al., "Nonlinear predictive control of steel slab reheating furnace", American Control Conference, 2008, pp. 957-963.* Ram et al., "Modelling furnace operations using simulation and heuristics", Simulation Conference Proceedings, 1998. Winter vol. 2, pp. 957-963.*

*Primary Examiner* — Crystal J Barnes-Bullock
(74) *Attorney, Agent, or Firm* — Dann, Dorfman, Herrell and Skillman, P.C.

(57) ABSTRACT

A method and computer program for the control of the heat treatment of batches of metal workpieces for increasing the degree of automation of industrial furnace plants presumes an identical batch layout, an identical treatment program, and an identical article geometry of metal workpieces and relates it to a model batch, which has been run using batch thermoelements. The model batch becomes the foundation for a new batch. Through the assumption of program parameters of the actually run process of the model batch into the program of the new batch to be run, new batch thermoelements are not required for the new batch to be run.

7 Claims, 3 Drawing Sheets

U.S. PATENT DOCUMENTS

| | | | | |
|---|---|---|---|---|
| 5,648,611 A | * | 7/1997 | Singh et al. | 73/598 |
| 6,268,270 B1 | * | 7/2001 | Scheid et al. | 438/522 |
| 6,373,033 B1 | * | 4/2002 | de Waard et al. | 219/497 |
| 6,730,885 B2 | * | 5/2004 | Suzuki et al. | 219/486 |
| 6,776,854 B2 | * | 8/2004 | Bardelmeier et al. | 148/213 |
| 6,803,548 B2 | * | 10/2004 | Wang et al. | 219/494 |
| 7,139,627 B2 | * | 11/2006 | Obara et al. | 700/96 |
| 7,198,684 B2 | * | 4/2007 | Broderick et al. | 148/677 |
| 7,404,670 B2 | * | 7/2008 | Willis | 374/14 |
| 2002/0156542 A1 | * | 10/2002 | Nandi | 700/30 |

* cited by examiner

Fig. 1

(PRIOR ART)

FIG. 3

METHOD AND COMPUTER PROGRAM FOR CONTROLLING THE HEAT TREATMENT OF METAL WORKPIECES

BACKGROUND OF THE INVENTION

1. Field of the Invention

The invention relates to a method and a computer program for controlling the heat treatment of metal workpieces for industrial furnace plants, in order to provide conditions for increasing the degree of automation of the loading of furnaces.

2. Description of the Related Art

For the optimal technological preparation of the heat treatment of metal workpieces to be performed in batches for industrial furnace plants, methods are known which are to rationalize the sequences. So-called batch thermoelements are used, which are to ensure complete heating through of a batch by comparison of the exterior/interior batch temperature. In this subprocess, the program segment durations are dynamically lengthened until both measured temperatures are equal. Program segment durations are defined by one skilled in the art as the times for the heat treatment of the workpiece in the particular treatment section, these program segment durations representing a part of values for technological heat treatment formulas.

The attachment of the described batch thermoelements is performed manually in each new batch and obstructs a desired continuous and automated sequence of the heat treatment.

EP 0 556 176 B2 (DE 691 04 377 T3) discloses a special control system for the planning of the workpiece treatment in a heat treatment method for a plurality of connected chambers of an industrial furnace plant. The processing chambers process at least two parts simultaneously using unique processing times. This control system also has storage means for recording specific processing times for each part. The method only generally teaches time planning in a continuous furnace structure having the steps of storing and recording the functions of the control system, but not in connection with batch thermoelements, which are to ensure complete heating through of a batch by comparison of the external/internal batch temperature.

A method and computer program for the automatic preparation of technological formulas for the heat treatment of metal workpieces in industrial furnaces has already been sought internally. Through a program-controlled determination, it is to be made possible that the performance of heat treatments of metal workpieces in industrial furnaces can be planned better before the beginning of the heat treatment in the particular industrial furnace. The goal was to increase the degree of automation.

For this purpose, it was proposed according to PCT/DE 2008/001454, in a method and computer program, using
- values for a material of a particular workpiece, details on heat treatment methods, and technical details of the particular industrial furnace,
- a step-by-step specification or generation of parameters which can be precalculated for the heat treatment of the workpiece, and
- a computer, which generates a heat treatment program, having databanks and a programmed storage of a generated heat treatment program and the retrieval for activation of the heat treatment in the industrial furnace 1. in a first program step, to select a material group and the material and to determine a heat treatment method as a function of the selected material,
2. in a second program step,
    to input a wall thickness,
    to select a comparative geometry,
    to input a batch weight, and
    to select a batch layout,
    as data of the workpiece/the batch, in order to calculate a virtual wall thickness automatically therefrom,
3. in a third program step, to integrate heating and quenching characteristics, which are a function of the material and are optionally manually changeable from the virtual wall thickness together with the data of the batch and the available parameters of the industrial furnace, and
4. in a fourth program step, firstly
    to load data of the selected material on treatment parameters and data of the selected heat treatment method into a formula structure template and
    to compile it into a formula structure from the formula structure template employing the data from a user interface, such as
       heating characteristic and
       quenching characteristic and, if necessary,
       a target hardness
    from which
    values of formula segments, such as
       segment durations, which will be discussed in greater detail in the further description of the invention,
       temperatures,
       ramp slopes and/or temperature ramps, and
       pressures
    are to be established and then, as a result of the fourth program step, a technological heat treatment formula is to be generated automatically, which can be reworked, stored in a program databank, and retrieved at the industrial furnace for the heat treatment of metal workpieces.

The method and program can be expanded in a fifth program step, in that a transmission of the heat treatment formula to the furnace occurs. For this purpose, for the heat treatment of the workpiece/the batch running autonomously in the industrial furnace, the heat treatment program is retrieved from the program databank and mediated for the heat treatment in the industrial furnace. Accordingly, in this program databank, heat treatment programs have already been prepared and stored in the program databank.

The heat treatment method/program sequences contained in this program databank may be applied more rationally in regard to the required installation and function of the described batch thermoelements.

The installation of the batch thermoelements and the comparison of the exterior/interior batch temperatures resulting therefrom is a significant effort in general in heat treatment methods according to the species as a subprocess, because the program segment duration must be dynamically lengthened until both measured temperatures are equal.

BRIEF SUMMARY OF THE INVENTION

The invention has the object of developing a method and computer program for controlling the heat treatment of metal workpieces in industrial furnace plants having an elevated degree of automation of the loading of the furnace, which has the following steps
   generation of a new batch,
   assignment of a heat treatment program to this batch,
   manual attachment of batch thermoelements to this batch,
   transmission of the heat treatment program to a PLC of a furnace, transport of the batch into the furnace,
starting and performance of a heat treatment cycle, and
unloading of the batch from the furnace,
the installation and functions of the batch thermoelements being rationalized and times thus being shortened.

The method according to the invention starts by referring to a model batch, which has been run using batch thermoelements. It was to be analyzed that an identical batch layout presumes an identical treatment program and identical article geometry of metal workpieces. The segment runtimes ascertained during the model batch are used as the foundation for the new batch, so that the corresponding segments have the same runtimes, which have been ascertained during the model batch with the aid of the batch thermoelements.

Starting from this analysis, the method of the invention recognizes a possible transfer of program parameters of the actual run process of the model batch into the program of the new batch to be run, so that new batch thermoelements are not necessary for the new batch to be run.

According to this finding according to the invention, a model batch is prepared and a program is used for this purpose. An option "define as model batch" can thus be selected during the preparation of a batch in a preparatory list. In the batch archive, such a batch can then be selected later directly via a code (batch ID) from an overview list of the model batches.

The method of the invention must solve two sets of problems, which functionally merge into one another in the particular program in a uniform and surprising effect according to the stated object.

1. The Running of the Model Batch

To run the model batch using batch thermoelements, a specific treatment program is assigned to the model batch. A photo of the batch layout can expediently also be assigned. Treatment program and batch layout are constant parameters for all batches which later use this model batch. After termination of the heat treatment of the model batch, its process course is available in the archive and a modified model batch program is automatically generated on the basis of the original program. The segment duration of the individual segments is replaced by the actual ascertained duration and the further use of batch thermoelements is deactivated.

2. The Use of the Model Batch from the Selection List

Later batches to be run may relate to an already existing model batch. The model batches are offered in a selection list, an identical treatment program initially being presumed. Upon such an assignment of the batch to a model batch, instead of the original treatment program, the modified program of the model batch is automatically assigned, which uses the actually run times of the model batch as the segment duration. Further batch thermoelements can thus be dispensed with. After transmission of the treatment program to the PLC (programmable logic controller), the new batch runs through the same cycle as the associated model batch. Presuming that identical batch layout, identical batch weight, and identical article geometry are provided, an identical heat treatment result is expected.

Through the application of the program according to the invention, the operator of an industrial furnace plant now manages without further batch thermoelements, if reference is made according to the invention to a model batch, which was run using batch thermoelements and identical batch layout, identical treatment program, and identical article geometry are to be presumed. The segment runtimes ascertained during the model batch are used as the foundation for the new batch, so that the corresponding segments have the same runtimes which have been ascertained during the model batch with the aid of the batch thermoelements.

Therefore, after the definition of the batch as a model batch, a modified model batch program can be automatically generated on the basis of the original program, the segment duration of the individual segments being replaced by the actually ascertained duration and the use of batch thermoelements being deactivated.

With the found program principle, the method of the invention surprisingly discloses a technical "learning process" from the assumption of program parameters of the actually run process of the model batch in the program of the new batch to be run.

In addition, the method of the invention can be incorporated in or combined with an interface of the program described at the beginning according to PCT/DE 2008/001454, in that the program according to the invention is stored in this program databank. These heat treatment programs contained in the program databank according to the invention may then be assigned to a model batch.

After termination of the heat treatment of this model batch, a model program having explicit program segment durations, which is associated with this model batch, is generated, which is in turn stored in the program databank.

Through the combined application of the described program according to PCT/DE 2008/001454 and the program according to the invention, the automatic program preparation is further optimized: This program already allows the automatic preparation of a heat treatment program for a specified material. In it, however, the program segment durations are sometimes not explicitly specified, but rather are a function of the process values input in the later process via batch thermoelements. Through the functionally merged use with the program according to the invention, these program segment durations may now be ascertained after the heat treatment of the model batch and automatically entered into the heat treatment program.

The invention is described in greater detail hereinbelow according to the work and/or program steps having variants of the main idea,
their expedient embodiments using interfaces, and
the hardware and software means to be used.

The method and computer program for controlling the heat treatment of metal workpieces for automatic industrial furnace plants initially comprises the following work steps:
generation of a new batch,
assignment of a heat treatment program to this batch,
manual attachment of batch thermoelements to this batch,
transmission of the heat treatment program to a PLC of a furnace,
transport of the batch into the furnace,
starting and performance of a heat treatment cycle, and
unloading of the batch from the furnace.

The method and program of the invention preferably includes the following novel steps:
a) the assignment of a heat treatment program to the batch is performed during the first batch of a sequence of several batches;
b) batch thermocouples are attached to this batch in the first batch of the sequence, and
c) after generation of a new batch, in the following batches in a new work step, a selection of the model batch is to be made, whose heat treatment program is to be used, and
then, in a new program step, the model program associated with the model batch to be selected is automatically assigned to the batch.

In accordance with a preferred embodiment of the invention after the step of the assignment of a heat treatment program to the batch, it may be exclusively defined in a further new step as the model batch during the first batch of the following.

According to another embodiment of the invention after the step of the performance of the heat treatment cycle, in a further new step, a model program, which is associated with this model batch, having explicit program segment durations may be automatically generated exclusively during the first batch of the following, so that these two steps together with the broad concept of the method of the invention form a first program variant of the invention.

In addition to the above variant, a complete second program variant can be implemented in that, together with the described broad method concept of the invention after the step of unloading the batch from the furnace, this batch is exclusively defined as the model batch during the first batch of the following in another new step, and after the step of the definition of the batch as the model batch, in still a further new step, a model program having explicit program segment durations, which is associated with this model batch, is exclusively generated during the first batch of the following are linked.

On this basis, the method of the invention additionally allows a combined incorporation at an interface of the program and method described in PCT/DE 2008/001454, the entirety of which is incorporated herein by reference.

The program for the automatic preparation of technological formulas for the heat treatment of metal workpieces in a furnace using
- values for a material of a particular workpiece, details on heat treatment methods, and technical details of the particular furnace,
- a step-by-step specification or generation of parameters which can be precalculated for the heat treatment of the workpiece, and
- a computer, which generates a heat treatment program, having databanks and a programmed storage of a generated heat treatment program and the retrieval for activation of the heat treatment in the furnace includes the following steps:
a) in a first program step, a material group and the material are selected and a heat treatment method is determined as a function of the selected material,
b) in a second program step, a wall thickness is input, a comparative geometry is selected, a batch weight is input, and a batch layout is selected as data of the workpiece batch, and a virtual wall thickness is calculated automatically therefrom
c) in a third program step, a material dependent heating and quenching characteristic, that is manually adjustable is derived from a combination of the virtual wall thickness, load data, and furnace parameters, if required, and
d) in a fourth program step, firstly data of the selected material on treatment parameters and data of the selected heat treatment method are loaded into a formula structure template and are compiled into a formula structure from the formula structure template employing the data from a user interface, such as heating characteristic and quenching characteristic and, if necessary, a target hardness, from which values of formula segments, such as segment durations, temperatures, ramp slopes and/or temperature ramps, and pressures are established and then, as a result of the fourth program step, a technological heat treatment formula is automatically generated, which can be reworked, stored in the program databank, and retrieved at the industrial furnace for the heat treatment of metal workpieces.

In regard to an interface for the present invention,
e) in the program databank in the typical work step of "assignment of a heat treatment program to the batch", the heat treatment program is selected which is assigned to the batch, which is then defined in a work step as the model batch, and
f) after termination of the heat treatment of this model batch, a model program, which is associated with this model batch, having explicit program segment durations is automatically generated, and is in turn stored in the program databank.

The program variants for the control of the heat treatment may be implemented so that upon an expedient preparation of the batch from a batch archive, a model batch is later selected directly via a code (batch ID) from a model list of the model batches.

The method according to the invention is advantageously implemented for comfortable program operation in that, with the use of appropriate user interfaces for the program control
- for the preparation of the model batch, the option "define as the model batch" is selected as the first program variant or
- for the preparation of the model batch, the option "model batch" is selected, in order to define the batch as the model batch as the second program variant, and
- using an already input model batch which is accessed from the selection list for batches to be run later, and upon such an assignment of the batch to a model batch instead of the original treatment program, the modified program of the model batch is automatically assigned, which uses the actual run times of the model batch as the segment durations, after the transmission of the treatment program to the PLC, the new batch running through the same cycle as the assigned model batch.

Here and throughout this specification the term "batch" means a load of metal work pieces to be heat treated.

The invention is described in greater detail hereafter on the basis of the drawings having exemplary embodiments in program variants and expedient applications.

DETAILED DESCRIPTION OF THE INVENTION

Figure 1:
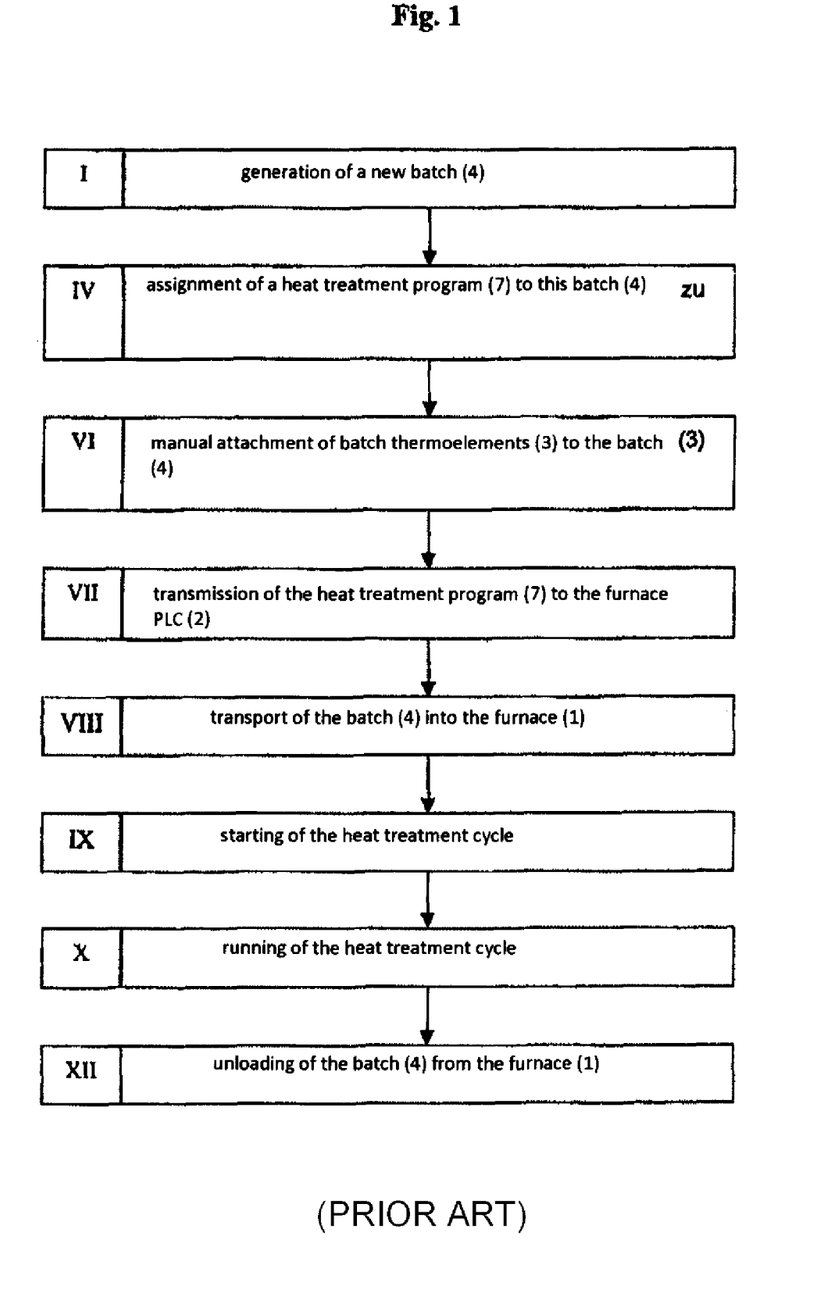
FIG. 1 is a flowchart of work steps according to the prior art.

According to FIG. 1, the sequence of a control of the heat treatment according to the invention comprises the following steps:
(I) the generation of a new batch 4,
(IV) the assignment of a heat treatment program 7 to this batch 4,
(VI) the manual attachment of batch thermoelements 3 to this batch 4,
(VII) the transmission of the heat treatment program 7 to a PLC 2 of a furnace 1,
(VIII) the transport of the batch 4 into the furnace 1, (IX) the starting and (X) the performance or the sequence of a heat treatment cycle, and (XII) the unloading of the batch 4 from the furnace 1.

For the sake of better overview, the numbering of these known work steps, which was performed using Roman numerals, was harmonized with the numbering of the work steps of the invention.

Figure 2:
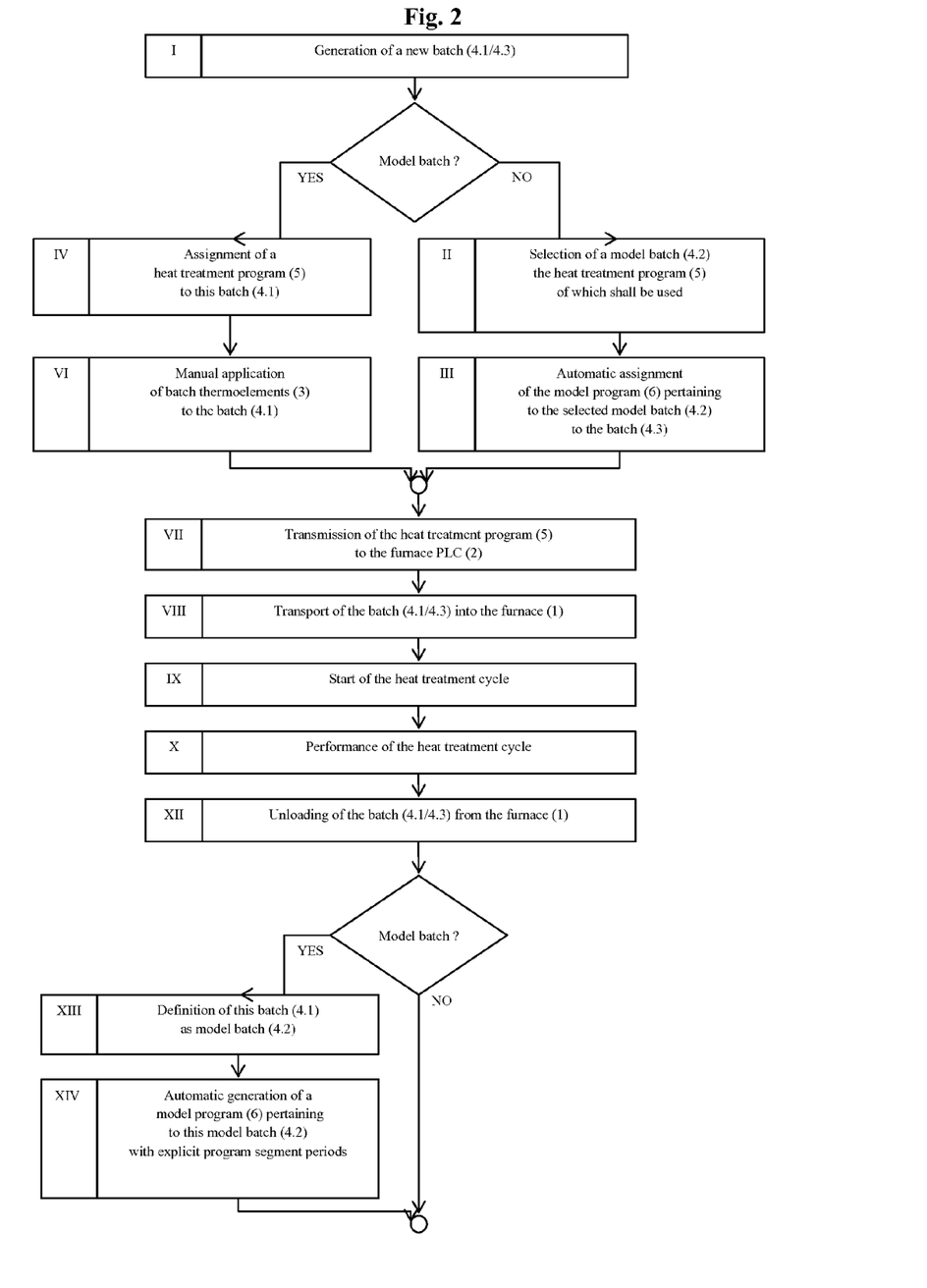
FIG. 2 is a flowchart of a heat treatment control program according to the invention.

Preferred sequences for the method and computer program according to the invention for the control of the heat treatment of metal workpieces for industrial furnace plants are shown in FIG. 2 having the following work steps. The reference numbers correspond to the components shown in FIG. 3.

a) (IV) assignment of a heat treatment program 7 to the batch 4 exclusively during the first batch 4 of the following, b) (VI) attaching batch thermoelements 3 to the batch 4 exclusively during the first batch 4 of the following, and c) after generation of a new batch 4, in following batches 4 in a work step II, a selection of the model batch 4, whose heat treatment program is to be used, and then, in a program step III, an automatic assignment of the model program 5, which is associated with the selected model batch 4, to the batch 4.

Figure 3:
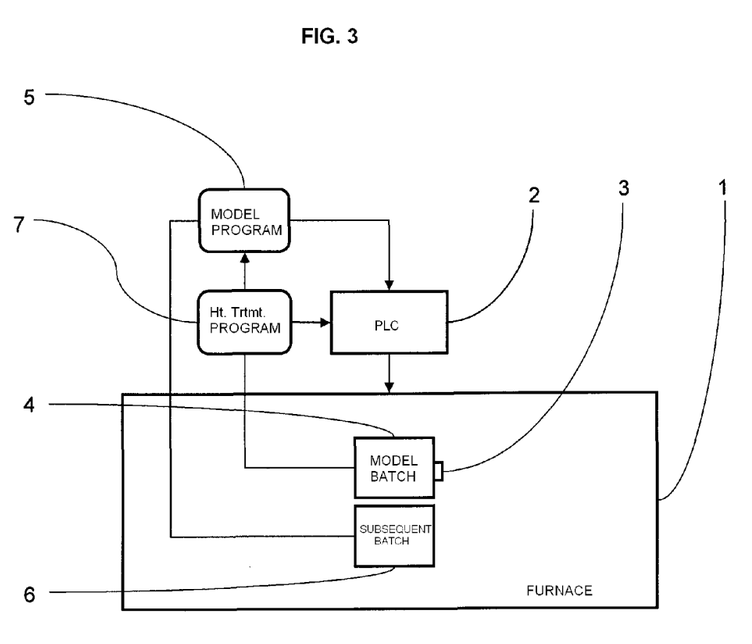
FIG. 3 is a schematic diagram of a heat treatment system for metal workpieces according to the invention.

Referring now to FIG. 3, a system for implementing the method and computer program according to the invention is shown. The system includes a furnace 1, which is automated with a PLC 2, for the heat treatment of metal workpieces, batch thermoelements 3, which are attached to a first batch 4 as the model batch 4 of the following, a heat treatment program as the model program 5, a following batch 6 after generation of a model batch 4, a heat treatment program 7, which controls the furnace 1 for the heat treatment of the metal workpieces as the computer program using typical hardware.

For practical use, according to FIG. 2 two advantageous program versions having the following sequences are presented hereafter.

Program I

According to a first branch of the embodiment shown in FIG. 2, the method and computer program according to the invention for the control of the heat treatment of batches of metal workpieces in the furnace 1 comprises the the following steps.

1.1 Generation of a new batch (4.1) in a program step (I), 1.2 Assignment of a heat treatment program (5) to this batch (4.1) in a program step (IV), 1.3 Manual attachment of batch thermo elements (3) to this batch (4.1) in a program step (VI), 1.4 Transmission of the heat treatment program (5) to a PLC (2) of a furnace (1) in a program step (VII).

1.5 Transport of the batch (4.1) into the furnace (1) in a program step (VIII), 1.6 Starting of a program step (IX) and performance of a heat treatment cycle in a program step (X), 1.7 Unloading of the batch (4.1) from the furnace (1) in a program step (XII), 1.8 Definition of the batch (4.1) as model batch (4.2) in a program step (XIII), and then 1.9 Automatic generation of a model program (6) pertaining to the model batch (4.2) with explicit program segment periods in a program step (XIV)

Program II

According to a second branch of the embodiment shown in FIG. 2, the method and computer program according to the invention for the control of the heat treatment of batches of metal workpieces in the furnace 1 comprises the following steps.

2.1 Generation of a new batch (4.3) in a program step (I), 2.2 Selection of the model batch (4.2) the heat treatment program (5) of which shall be used in a program step (II), 2.3 Automatic assignment of the model program (6) pertaining to the model batch (4.2) to the batch (4.3) in a program step (III), 2.4 Transmission of the heat treatment program (5) to a PLC (2) of a furnace (1) in a program step (VII), 2.5 Transport of the batch (4.3) into the furnace (1) in a program step (VIII), 2.6 Starting of a program step (IX) and performance of a heat treatment cycle in a program step (X), 2.7 Unloading of the batch (4.3) from the furnace (1) in a program step (XII).

The embodiments of the method and computer program described above may be combined at an interface with a method and computer program for the automatic preparation of technological formulas for the heat treatment of metal workpieces in the furnace 1 using values for a material of a particular workpiece, details of heat treatment methods, and technical details of the particular furnace 1, a step-by-step specification or generation of parameters which can be precalculated for the heat treatment of the workpiece, a computer, which generates a heat treatment program, having databanks and a programmed storage of a generated heat treatment program and the retrieval for activation of the heat treatment in the furnace 1, in which a) in a first program step, a material group and the material are selected and a heat treatment method is determined as a function of the selected material, b) in a second program step, a wall thickness is input, a comparative geometry is selected, a batch weight is input, and a batch layout is selected as data of the workpiece, and a virtual wall thickness is calculated automatically therefrom, c) in a third program step, heating and quenching characteristics, which are a function of the material and are optionally manually changeable, are integrated from the virtual wall thickness together with the data of the batch and the available parameters of the furnace 1 d) in a fourth program step, firstly data of the selected material on treatment parameters and data of the selected heat treatment method are loaded into a formula structure template and are compiled into a formula structure from the formula structure template employing the data from a user interface, such as heating characteristic and quenching characteristic and, if necessary, a target hardness, from which values of formula segments, such as segment durations, temperatures, ramp slopes and/or temperature ramps, and pressures are established, and then a technological heat treatment formula is automatically generated as a result of the fourth program step, which can be reworked, stored in a program databank, and retrieved for the heat treatment of metal workpieces at the furnace 1, in such a manner, in that e) in the program databank according to the invention, in the work step IV according to FIG. 2 and FIG. 3, a heat treatment program 7 is selected, which is assigned to a batch 4, which is then defined as the model batch 4 in the work step V according to FIG. 2 or work step XIII according to FIG. 3, and f) after termination of the heat treatment of this model batch 4, a model program 5, which is associated with this model batch 4, having explicit program segment durations is automatically generated, which is in turn stored in the described program databank.

The particular computer program according to the invention can be operated comfortably if a user interface is used, in which the marked option "defined as model batch" is selected for preparation of the model batch and/or in which the marked option "model batch" is selected in order to define the batch 4 as the model batch 4. Finally, the comfortable operation of the computer program is expanded further if using the user interface, an already input model batch 4 is accessed from the selection list for batches 6 to be run later. Upon such an assignment of the batch 6 to a model batch 4, instead of the original treatment program such as heat treatment program 7, the modified program such as model program 5 of the model batch 4 is automatically assigned. This uses the actual run times of the model batch 4 as the segment durations. After transmission of the treatment program to the PLC 2 corresponding to step VII according to FIG. 2, the new batch 6 runs through the same cycle as the assigned model batch 4.

INDUSTRIAL APPLICABILITY

The method and program according to the invention has proven itself in internal operational testing. Because the manual attachment of batch thermoelements to the batch is only required during the first batch, but not during the following batches, operation which is already automated, in particular with respect to the loading of furnaces 1, is increased further in its degree of automation. This ensures higher availability to the operators of plants having industrial furnaces. Already operating industrial furnace plants may be readily retrofitted according to the invention.

List Of Reference Numerals
 1 furnace
 2 PLC
 3 batch thermoelements
 4 model batch, first batch of the following
 5 heat treatment program as model program
 6 batch, following batch after generation of a model batch 4
 7 heat treatment program
Work/program steps
 I generation of a new batch 4, 6
 II selection of the model batch 4, whose heat treatment program 5 is to be used
 III automatic assignment of the model program 5, which is associated with a selected model batch 4
 IV assignment of a heat treatment program 7 to the batch 4
 V definition of the model batch 4 according to FIG. 2
 VI manual attachment of batch thermoelements 3 to the batch 4
 VII transmission of the heat treatment program to a PLC 2 of a furnace 1
 VIII transport of the batch 4/6 into the furnace 1
 IX starting of a heat treatment cycle and
 X performance of the heat treatment cycle
 XII unloading of the batch 4/6 from the furnace 1
 XIII definition of the model batch 4 according to FIG. 2
 XIV automatic generation of a model program 5 according to FIG. 2.

The invention claimed is:

1. A method for the control of the heat treatment of metal workpieces in an automated industrial heat treating furnace comprising the steps of:
 providing a first batch in a series of batches of metal work pieces to be heat treated,
 assigning a heat treatment program to the first batch,
 manually attaching one or more batch thermoelements to the first batch,
 transmitting the heat treatment program to a programmable logic controller (PLC) of an industrial heat treating furnace,
 transporting the first batch into the furnace,
 starting a heat treatment cycle that is based on the assigned heat treatment program,
 performing the heat treatment cycle on the first batch,
 unloading of the batch from the furnace,
 wherein the
 heat treatment program is assigned only to the first batch during heat treatment of the first batch,
 the thermoelements are attached only to the first batch during heat treatment of the first batch, and
 for a subsequent batch in the series of batches, performing the following steps:
  selecting a model batch whose heat treatment program is to be used, and
  then automatically assigning a model program which is associated with the selected model batch to the subsequent batch for heat treating said subsequent batch.

2. The method according to claim 1, wherein, after the unloading of the first batch from the furnace, the first batch is defined as the model batch.

3. The method according to claim 2, wherein, after the first batch is defined as the model batch, the model program, which is associated with the model batch, is generated, said model program defining explicit program segment durations for the heat treatment.

4. The method according to claim 1 wherein before the step of providing the first batch the method comprises performing a method for the automatic preparation of technological formulas for heat treatment of metal workpieces in a furnace comprising the step of using
 values for a material of a particular workpiece, details on heat treatment methods, and technical details of the particular furnace,
 a step-by-step specification or generation of parameters, which can be precalculated, for the heat treatment of the workpiece, and
 a computer, which generates a heat treatment program, said computer having databanks and a programmed storage of a generated heat treatment program and the retrieval for activation of the heat treatment in the furnace, and performing the following program steps with the computer:
  a) in a first program step, selecting a material group and a material and determining a heat treatment method as a function of the selected material,
  b) in a second program step, inputting a wall thickness, selecting a comparative geometry, inputting a batch weight, and selecting a batch layout as data of the workpiece batch, and calculating a virtual wall thickness automatically therefrom,
  c) in a third program step, integrating heating and quenching characteristics, which are a function of the material and are optionally manually changeable, from the virtual wall thickness together with the data of the batch and available parameters of the furnace (1), d) in a fourth program step, loading data of the selected material on treatment parameters and data of the selected heat treatment method into a formula structure template and compiling the loaded data into a formula structure from the formula structure template employing the data from a user interface, such as heating characteristic and quenching characteristic and, if necessary, a target hardness, from which values of formula segments, such as segment durations, temperatures, ramp slopes and/or temperature ramps, and pressures are established, and then automatically generating a technological heat treatment formula as a result of the fourth program step, which can be reworked, stored in a program databank, and retrieved for the heat treatment of metal workpieces at the furnace, wherein e) in the program databank according to the invention, selecting a heat treatment program which is assigned to a batch, and then defining said batch as the model batch, and f) after termination of the heat treatment of this model batch, automatically generating a model program, which is associated with the model batch, having explicit program segment durations and then storing the model program in the program databank.

5. The method according to claim 4, comprising the step of using a user interface for the preparation of the model batch, in which an option "define as model batch" is selected.

6. The method for the control of the heat treatment of metal workpieces according to claim 4, comprising the step of using a user interface for the preparation of the model batch, in which an option "model batch" is selected, in order to define the batch as the model batch.

7. The method according to claim 4, comprising the steps of selecting a model batch from a list of previously defined model batches, associating the subsequent batch with the selected model batch, and then assigning a the model program previously generated for the selected model batch as the heat treatment program for the subsequent batch, wherein the assigned model program uses the actual run times of the model batch as the segment durations, and after transmission of the model program to the PLC, the subsequent batch runs through the same heat treatment cycle as the selected model batch.

* * * * *